US010940567B2

(12) United States Patent
Brower et al.

(10) Patent No.: US 10,940,567 B2
(45) Date of Patent: Mar. 9, 2021

(54) IN SITU FORMATION OF THREADS THROUGHOUT BORE OF SLEEVE INSERTED INTO SUBSTRATE HOLE

(71) Applicant: International Business Machines Corporation, Armonk, NY (US)

(72) Inventors: David M. Brower, Wake Forest, NC (US); Dean F. Herring, Youngsville, NC (US)

(73) Assignee: International Business Machines Corporation, Armonk, NY (US)

(*) Notice: Subject to any disclaimer, the term of this patent is extended or adjusted under 35 U.S.C. 154(b) by 147 days.

(21) Appl. No.: 14/546,384

(22) Filed: Nov. 18, 2014

(65) Prior Publication Data
US 2015/0071705 A1 Mar. 12, 2015

Related U.S. Application Data

(62) Division of application No. 12/952,654, filed on Nov. 23, 2010, now Pat. No. 8,919,172.

(51) Int. Cl.
*B23P 23/00* (2006.01)
*B23P 19/04* (2006.01)
(Continued)

(52) U.S. Cl.
CPC ............ *B23P 23/00* (2013.01); *B21C 37/207* (2013.01); *B21J 15/043* (2013.01); *B21J 15/12* (2013.01);
(Continued)

(58) Field of Classification Search
CPC ......... B21C 37/207; B21C 3/16; B21C 37/20; B21C 37/30; B21J 15/043; B21J 15/12;
(Continued)

(56) References Cited

U.S. PATENT DOCUMENTS 466,463 A * 1/1892 Holland .............. F16B 25/0015
411/399
1,238,636 A * 8/1917 Christofferson ........ F16B 35/06
411/399
(Continued)

FOREIGN PATENT DOCUMENTS

SU 1449235 A1 * 1/1989

OTHER PUBLICATIONS

Translation of SU 1449235, Translated Dec. 30, 1993, 6 Pages. (Year: 1989).*
(Continued)

*Primary Examiner* — Gregory D Swiatocha
(74) *Attorney, Agent, or Firm* — Jamar K. Ray

(57) ABSTRACT

Threads are formed in situ throughout a bore of a sleeve inserted into a corresponding hole in a substrate. A sleeve having a bore is inserted into a corresponding hole of a substrate. A mandrel is rotated through the sleeve. The mandrel has a threaded ended; the threaded end rotating throughout the bore of the sleeve forms threads throughout the bore. Prior to inserting the sleeve into the corresponding hole of the substrate, the sleeve can be placed onto the mandrel. In this case, the mandrel has an increasing diameter at the threaded end thereof, such that the sleeve rests on the mandrel towards the threaded end thereof where the bore has a smaller diameter than the mandrel. The mandrel is then rotated out of the sleeve in a direction opposite the direction in which the sleeve has been inserted into the corresponding hole of the substrate.

6 Claims, 6 Drawing Sheets

(51) Int. Cl.
| | |
|---|---|
| *F16B 5/02* | (2006.01) |
| *B21C 37/20* | (2006.01) |
| *B21J 15/04* | (2006.01) |
| *B21J 15/12* | (2006.01) |
| *B21J 15/14* | (2006.01) |
| *B21K 1/56* | (2006.01) |
| *B23P 11/00* | (2006.01) |
| *B29C 65/00* | (2006.01) |
| *B29L 31/00* | (2006.01) |

(52) U.S. Cl.
CPC ............... *B21J 15/147* (2013.01); *B21K 1/56* (2013.01); *B23P 11/005* (2013.01); *B23P 19/04* (2013.01); *F16B 5/02* (2013.01); *B29C 66/131* (2013.01); *B29C 66/474* (2013.01); *B29L 2031/737* (2013.01); *Y10T 29/4994* (2015.01); *Y10T 29/51* (2015.01); *Y10T 29/5191* (2015.01); *Y10T 403/68* (2015.01)

(58) Field of Classification Search
CPC ... B21J 15/147; B23P 11/005; Y10T 29/4994; B21D 39/20; B21D 41/026
USPC .............. 72/370.06, 370.08, 370.17
See application file for complete search history.

(56) References Cited

U.S. PATENT DOCUMENTS

| | | | | |
|---|---|---|---|---|
| 1,770,585 A * | 7/1930 | Steinruck | ................. | B23G 5/06 408/218 |
| 2,067,593 A * | 1/1937 | Benninghoff | ............ | B23G 1/22 408/169 |
| 2,802,503 A * | 8/1957 | Zupa | .................... | F16B 33/004 16/381 |
| 2,876,485 A * | 3/1959 | Cowles | ................. | A47C 7/002 16/42 R |
| 3,193,857 A | 7/1965 | Kahn | | |
| 3,193,921 A * | 7/1965 | Kahn | ................. | F16B 19/1072 285/382.4 |
| 3,269,006 A * | 8/1966 | Welles, Jr. | ............. | B21D 39/06 29/517 |
| 3,835,688 A * | 9/1974 | King, Jr. | ................ | B21J 15/043 72/370.07 |
| 3,880,041 A * | 4/1975 | Markowski | ............. | F16B 37/12 411/34 |
| 3,903,784 A * | 9/1975 | Dekker | ................. | F16B 35/065 411/399 |
| 3,921,280 A | 11/1975 | King, Jr. | | |
| 4,325,665 A | 4/1982 | Jukes | | |
| 4,646,548 A * | 3/1987 | Zimmerli | .............. | B21C 37/207 29/523 |
| 4,854,148 A * | 8/1989 | Mayer | ................... | B21C 37/207 72/68 |
| 4,875,815 A * | 10/1989 | Phillips, II | .......... | F16B 19/1054 411/183 |
| 5,051,048 A * | 9/1991 | Maddox | .............. | F16B 19/1072 411/34 |
| 5,051,636 A * | 9/1991 | Ishimoto | .................. | H02K 5/24 310/51 |
| 5,146,668 A * | 9/1992 | Gulistan | .................. | B21K 1/70 29/525 |
| 5,199,839 A * | 4/1993 | DeHaitre | ............ | F16B 23/0076 411/387.3 |
| 5,327,756 A * | 7/1994 | Fox | ...................... | B21C 37/202 72/68 |
| 6,402,757 B1 * | 6/2002 | Moore, III | ........... | A61B 17/862 606/104 |
| 8,011,220 B2 * | 9/2011 | Brochheuser | ........... | B21C 23/20 72/264 |
| 8,573,022 B2 * | 11/2013 | Thors | ...................... | B21C 37/20 72/370.16 |
| 8,919,172 B2 | 12/2014 | Brower et al. | | |
| 2002/0021948 A1 * | 2/2002 | Stumpf | ................. | F16B 37/122 411/180 |
| 2003/0148819 A1 * | 8/2003 | Lindner | ............... | A63B 53/145 473/316 |
| 2008/0093202 A1 * | 4/2008 | Di Centa | ............. | H01H 1/0015 200/15 |
| 2010/0111639 A1 | 5/2010 | Gaudron | | |
| 2010/0193171 A1 * | 8/2010 | Beppu | ...................... | B21C 1/24 165/181 |
| 2010/0319425 A1 * | 12/2010 | Beppu | ...................... | B21C 1/24 72/39 |
| 2012/0125072 A1 | 5/2012 | Brower et al. | | |

OTHER PUBLICATIONS

Non-final office action for U.S. Appl. No. 12/952,654 dated Aug. 21, 2013, 6 pp.
Final office action for U.S. Appl. No. 12/952,654 dated May 23, 2014, 7 pp.
Notice of allowance for U.S. Appl. No. 12/952,654 dated Aug. 21, 2014, 8 pp.

* cited by examiner

IN SITU FORMATION OF THREADS THROUGHOUT BORE OF SLEEVE INSERTED INTO SUBSTRATE HOLE

BACKGROUND

Electronic device cases such as computing device cases, as well as other types of device cases, can be formed from a plastic substrate. A plastic substrate has low precision. This means it is difficult to maintain manufacturing tolerances when drilling a hole through the substrate, because the hole has a likelihood of becoming larger than desired. As such, it can be difficult for a machine screw or other threaded member to remain in place when screwed within a hole of such a substrate.

Therefore, when a machine screw or other threaded member has to be screwed into a substrate having low precision, such as a plastic substrate, typically a sleeve having a threaded bore is first inserted into a hole of the substrate. The machine screw or other threaded member is then screwed into the sleeve. The sleeve has a higher precision than the substrate, so that the machine screw or other threaded member remains in place within the sleeve.

SUMMARY OF THE INVENTION

A method of an embodiment of the invention includes inserting a sleeve having a bore into a corresponding hole of a substrate. A mandrel is rotated throughout the sleeve. The mandrel has a threaded end. As such, the threaded end of the mandrel is rotated throughout the bore of the sleeve, forming threads throughout the bore.

An apparatus of an embodiment of the invention includes a substrate having a hole, and a sleeve within the hole. The sleeve has a bore therethrough. The bore has in situ formed threads throughout a length of the bore.

A device of an embodiment of the invention includes a sleeve and a cylindrical mandrel. The sleeve has a bore therethrough, and is placed on the cylindrical mandrel. The cylindrical mandrel has a threaded end such that the sleeve is to rest on the cylindrical mandrel towards the threaded end where the bore has a smaller diameter than the cylindrical mandrel.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
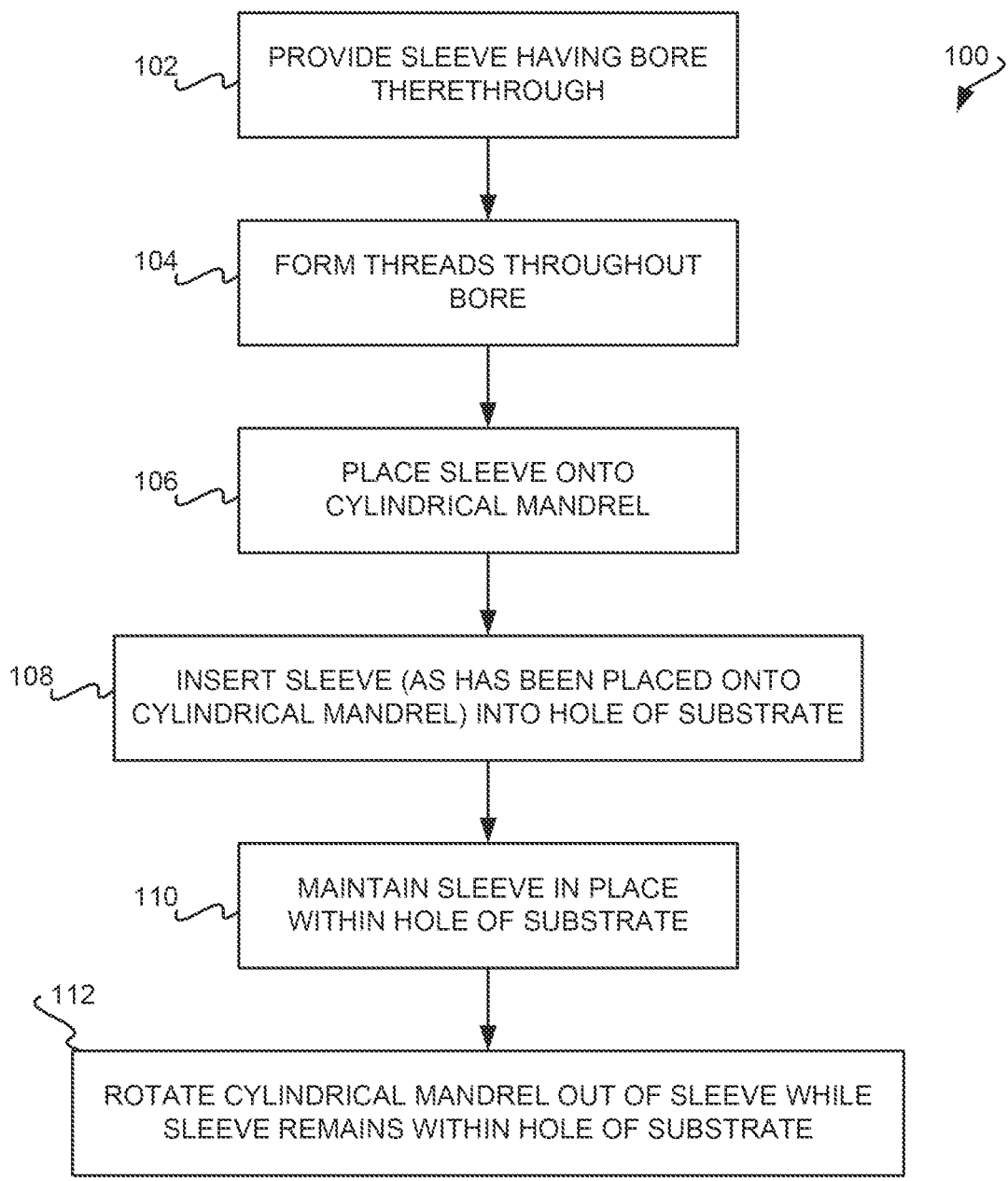
FIG. 1 is a flowchart of a method for in situ forming threads within the bore of a sleeve inserted into a hole of a substrate, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, when a machine screw or other threaded member is to be screwed into a substrate having low precision, such as a plastic substrate, typically a sleeve having a threaded bore is first inserted into a hole of the substrate. Ideally, it is known a priori that such a threaded member will be inserted into the substrate of a device. As such, during formation of the device, the sleeve can be inserted into a hole of the substrate. For instance, where the substrate is plastic, plastic welding techniques can be employed to affix the sleeve within a hole of the substrate.

However, in some situations, it is not known that a threaded member like a machine screw is to be inserted into the substrate of a device until after the device has been formed. In this case, the sleeve cannot be inserted into a hole of the substrate during formation of the device. Rather, a hole has to be formed within the substrate after formation of the device, and a sleeve then inserted into the hole for subsequent reception of the threaded member.

Disclosed herein are approaches for inserting a sleeve into a hole of a substrate such that threads throughout the bore are formed in situ—that is, after the sleeve has been inserted into a hole of a substrate, and while the sleeve is in the hole. These approaches result in the threads being formed throughout the length of the bore, instead of only at one end of the bore, as is typically achieved within the prior art. This results in the corresponding threads of the machine screw or other threaded member being more securely attached to the sleeve upon screwing such a threaded member into the sleeve.

In one embodiment, a sleeve having a bore therethrough is placed onto a cylindrical mandrel that has an increasing diameter at a threaded end thereof. As such, the sleeve rests on the cylindrical mandrel towards the threaded end of the mandrel where the bore has a smaller diameter than the mandrel. The sleeve, as has been placed on the cylindrical mandrel, is inserted into a corresponding hole of a substrate.

The cylindrical mandrel is then rotated out of the sleeve while the sleeve remains in place within the hole. The threaded end of the mandrel is thus rotated throughout the bore of the sleeve, to form threads throughout the bore.

Furthermore, when the cylindrical mandrel is rotated out of the sleeve, the mandrel causes the sleeve to expand perpendicular to the bore so that the sleeve engages an inner surface of the substrate defined by the hole. The outer surface of the sleeve may be a knurled surface. This knurled surface bites into the inner surface of the substrate to lock the sleeve within the hole of the substrate. As such, the sleeve remains secured within the hole of the substrate, and a threaded member like a machine screw can subsequently be screwed into the bore of the sleeve.

FIG. 1 shows a method 100, according to an embodiment of the invention. A sleeve having a bore therethrough along the length of the sleeve is provided (102). A bore is a circular-shaped hole. The sleeve is made from a high precision material, in that manufacturing tolerances of the sleeve are able to be maintained. For instance, the desired diameter of the sleeve (where the sleeve is cylindrical), and the desired diameter of the bore are able to be maintained. The sleeve is made from a material that is also malleable, such as a soft metal like bronze, copper, and so on. The outer surface of the sleeve may be a knurled surface. A knurled surface is a three-dimensional diamond-shaped crisscross diamond shaped pattern that is cut or rolled into the sleeve.

Figure 2:
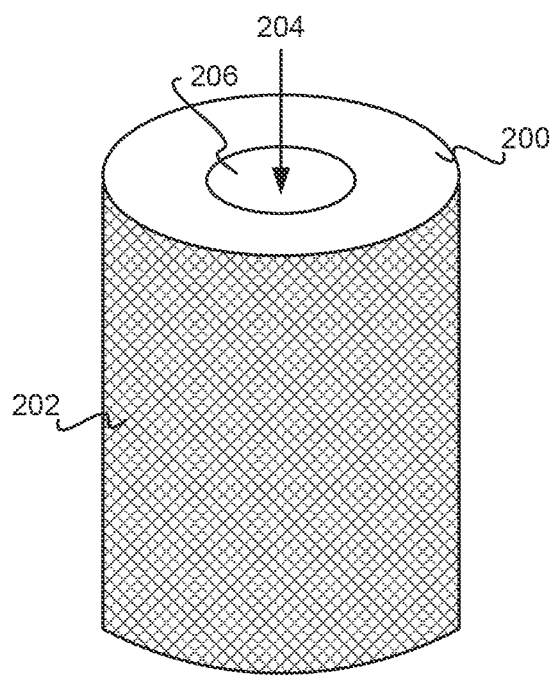
FIG. 2 is a diagram of a sleeve having a bore, according to an embodiment of the invention.

FIG. 2 shows a representative sleeve 200, according to an embodiment of the invention. The sleeve 200 has a bore 204 through the length of the sleeve 200. In the example of FIG. 2, the sleeve 200 is itself cylindrically shaped. The sleeve 200 has outer surface 202 and an inner surface 206. As depicted in FIG. 2 by cross-hatching, the outer surface 202 is a knurled surface. The inner surface 206 is defined by the bore 204.

Referring back to FIG. 1, in one embodiment, threads may be formed throughout the bore (104). The threads may be formed by drilling an appropriately threaded drill bit into and then out of the bore in one embodiment. The diameter of the drill bit is desirably slightly greater than the diameter of the bore. It is noted that in another embodiment, threads are not formed throughout the bore. Rather, the inner surface of the sleeve defined by the bore remains smooth and without threads.

Figure 3:
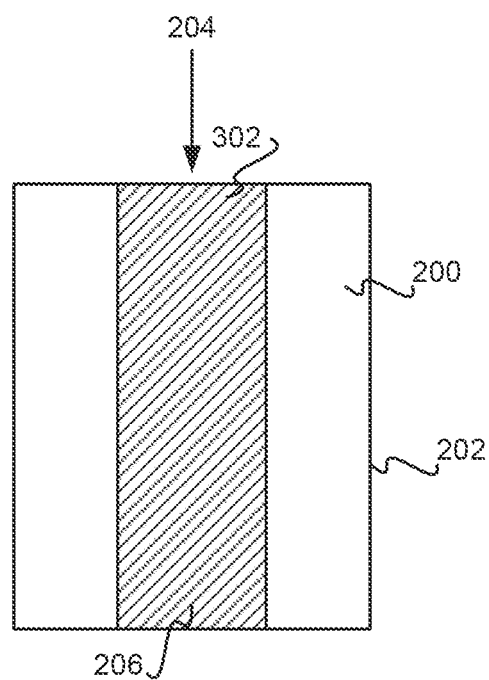
FIG. 3 is a cross-sectional diagram of a sleeve having a bore with preformed threads, according to an embodiment of the invention.

FIG. 3 shows a cross section of the sleeve 200, after part 104 of the method 100 has been performed, according to an embodiment of the invention. Depicted in FIG. 3 is the outer surface 202, the bore 204, and the inner surface 206 of the sleeve 200. Threads 302 have been formed throughout the length of the bore 204. More specifically, threads 302 have been formed on the inner surface 206 defined by the bore 204 of the sleeve 200.

Referring back to FIG. 1, the sleeve is placed onto a cylindrical mandrel (106), such that the sleeve rests on the cylindrical mandrel. The sleeve and the cylindrical mandrel together constitute a fastening device. The cylindrical mandrel is formed from a material harder than the malleable material from which the sleeve is formed. For instance, the cylindrical mandrel may be a hard metal such as steel or iron, or may be another type of hard material.

The cylindrical mandrel has a first end and a second end. The second end of the cylindrical mandrel is threaded, and is referred to as the threaded end of the mandrel. The threads of mandrel correspond to the threads formed throughout the bore, where such threads have been formed in part 104, in spatial frequency, but are slightly larger in diameter than the threads of the bore. The diameter of the threaded end of the cylindrical mandrel decreases towards the other, first end of the mandrel. Stated another way, the threaded end of the mandrel has an increasing diameter. At some point the diameter of mandrel towards the threaded end is greater than the diameter of the bore of the sleeve. By comparison, the diameter of the mandrel at the first end is less than the diameter of the bore.

Figure 4A:
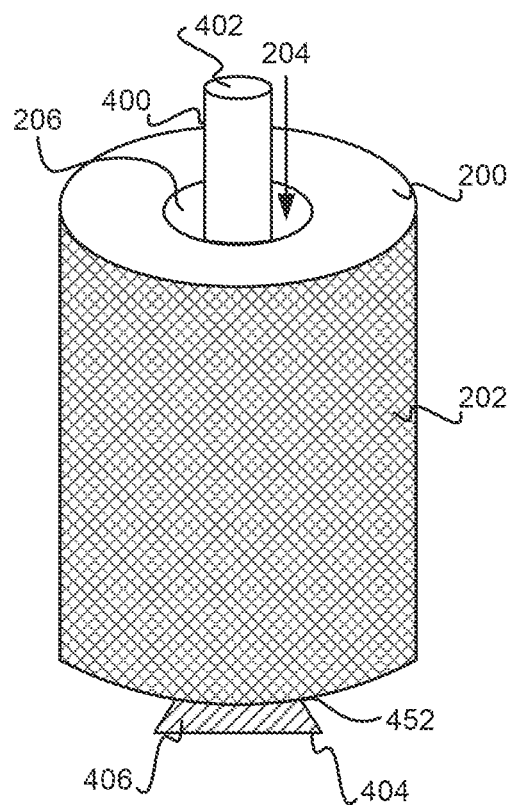
FIGS. 4A and 4B are a diagram and a cross-sectional diagram, respectively, of a sleeve placed onto a cylindrical mandrel, according to an embodiment of the invention.
Figure 4B:
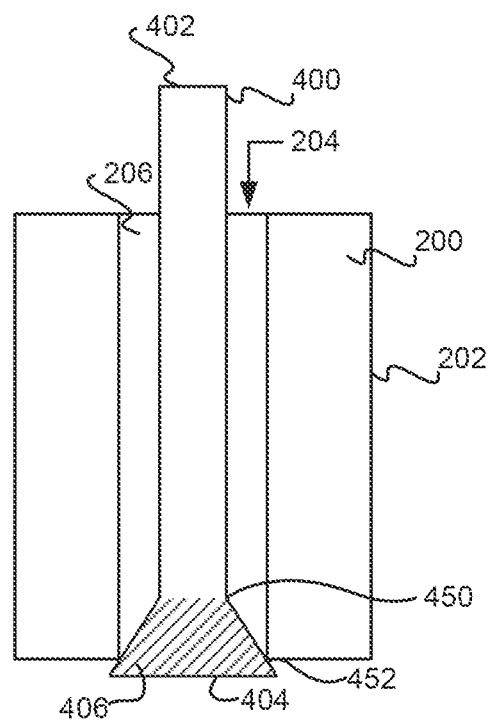

FIGS. 4A and 4B show the sleeve 200 resting on a representative cylindrical mandrel 400, according to an embodiment of the invention, where FIG. 4B specifically depicts a cross section of the sleeve 200 resting on the cylindrical mandrel 400. Depicted in FIGS. 4A and 4B are the outer surface 202, the bore 204, and the inner surface 206 of the sleeve 200. The bore 204 is not threaded in the example of FIGS. 4A and 4B. The cylindrical mandrel 400 has a first end 402 and a second end 404.

The cylindrical mandrel 400 has a constant diameter less than the diameter of the bore 204 from the first end 402 to a point 450 towards the second end 404. At the point 450, the cylindrical mandrel 400 has an increasing diameter to the second end 404. At a point 452, the cylindrical mandrel 400 has a diameter greater than the diameter of the bore 204; that is, the diameter of the bore 204 is smaller than the diameter of the mandrel 400 at the point 452. As such, the sleeve 200 rests on the cylindrical mandrel 400 at the point 452 of the mandrel 400.

The cylindrical mandrel 400 is threaded with threads 406 from the point 450 to the second end 404 of the mandrel 400. The second end 404 of the mandrel 400 can thus be referred to as the threaded end of the mandrel 400. It is noted that in one embodiment, at all points the cylindrical mandrel 400 is cylindrical in shape, and the mandrel 400 varies between the ends 402 and 404 just in that its diameter starts increasing at the point 450, and in that the mandrel 400 is threaded between the point 450 and the end 404. More generally, the mandrel 400 does not have to be cylindrical, but rather can be trilobular in shape. The mandrel 400 is described herein as being cylindrical for exemplary purposes only.

Referring back to FIG. 1, the sleeve as has been placed onto the cylindrical mandrel is inserted into a hole of the substrate (108). The hole is desirably slightly larger in size (such as in diameter) than the sleeve, and more generally is larger than the sleeve. The substrate may be part of an electronic device case, another type of case, or another type of apparatus. The substrate can have a precision lower than the sleeve with respect to manufacturing tolerances of the hole of the substrate and manufacturing tolerances of the sleeve. The sleeve is said to be inserted into the hole of the substrate in an insertion direction.

The sleeve is maintained in place within the hole of the substrate (110). For instance, the sleeve may have a lip that is larger in size (such as in diameter) than the hole of the substrate. The sleeve is inserted into the hole of the substrate until the lip comes into contact with the substrate. A force may then be applied against the lip so that the sleeve is maintained in place within the hole of the substrate.

Figure 5:
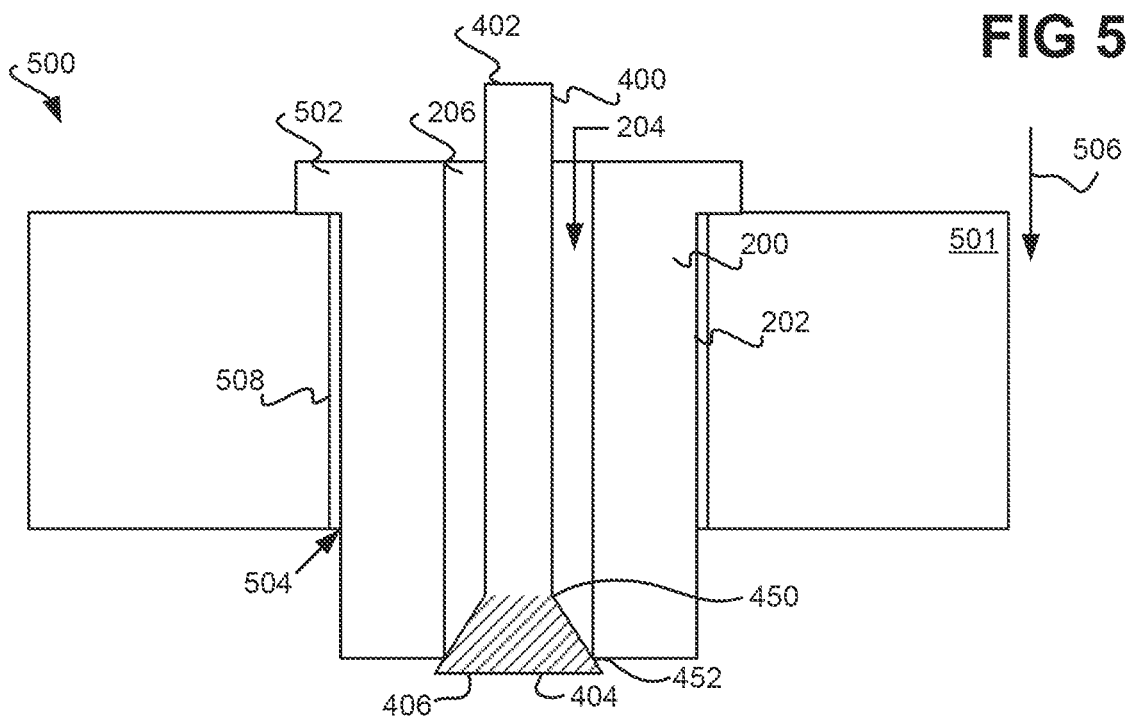
FIG. 5 is a cross-sectional diagram of an apparatus including a sleeve resting on a cylindrical mandrel, and a substrate having a hole into which the sleeve has been inserted, according to an embodiment of the invention.

FIG. 5 shows a cross section of a representative apparatus 500, according to an embodiment of the invention. The apparatus 500 includes a substrate 501 and the sleeve 200. The cylindrical mandrel 400 is also depicted in FIG. 5. The sleeve 200 includes a lip 502, and the substrate 501 has a hole 504. The outer surface 202, the bore 204, and the inner surface 206 of the sleeve 200 are depicted in FIG. 5, as are the ends 402 and 404, the threads 406, and the points 450 and 452 of the cylindrical mandrel 400.

The hole 504 of the substrate 501 is slightly larger in size (e.g., diameter) than the outer surface 202 of the sleeve 200.

The hole 504 defines an inner surface 508 of the substrate 501. Therefore, the sleeve 200 can be inserted into the hole 504 in the insertion direction 506, as is depicted in FIG. 5, until the lip 502 of the sleeve 200 comes into contact with the substrate 501. To maintain the sleeve 200 in place within the hole 504 of the substrate 501, a force can be applied against the sleeve 200. More specifically, this force can include an anti-rotational force component to minimize rotation of the sleeve 200 as the cylindrical mandrel 400 is rotated out of the sleeve.

Referring back to FIG. 1, while the sleeve remains within the hole of the substrate, the cylindrical mandrel is rotated out of the sleeve (112). The cylindrical mandrel is rotated out of the sleeve in a direction opposite to the insertion direction in which the sleeve was inserted into the hole of the substrate. The threaded end of the cylindrical mandrel is thus rotated throughout the bore of the sleeve, and because the threaded end has a larger diameter than the bore, forms threads throughout the length of the bore. As such, the threads are in situ formed, while the sleeve is within the hole.

Furthermore, rotation of the cylindrical mandrel out of the sleeve expands the sleeve perpendicular to the bore, so that the sleeve engages an inner surface of the substrate. Where the outer surface of the sleeve is knurled, such expansion of the sleeve also causes the outer surface to bite into the inner surface of the substrate. As such, the sleeve is locked in place within the hole of the substrate.

Where the bore has had threads preformed along its length in part 104, the threads formed by rotating the cylindrical mandrel out of the sleeve are formed coincident with these preformed threads. The preformed threads are shallower than the threads of the cylindrical mandrel. Therefore, the cylindrical mandrel creates threads within the bore that are deeper than the bore's preformed threads, but that are located at the same locations as the bore's preformed threads. By comparison, where the bore has not had any threads preformed along its length, such that its inner surface is smooth, the threads formed by rotating the cylindrical mandrel out of the sleeve are the only threads formed throughout the bore.

Figure 6:
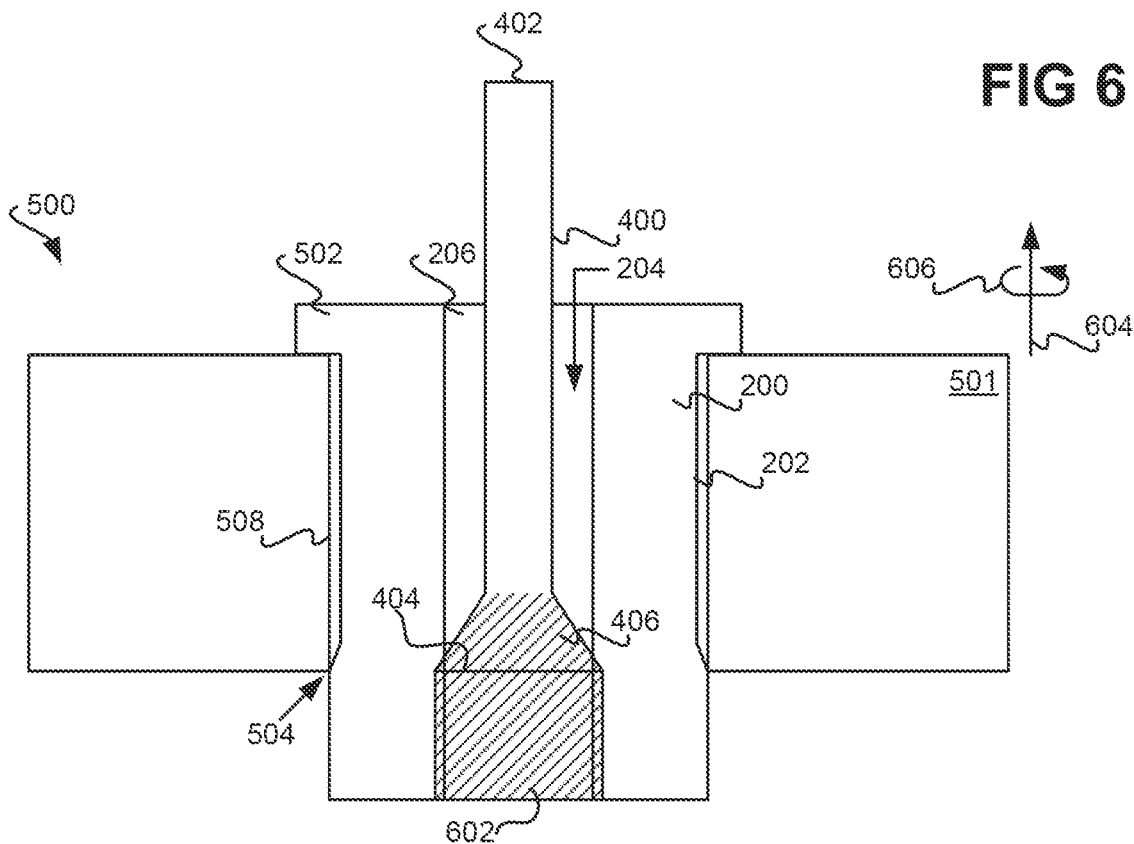
FIG. 6 is a cross-sectional diagram of an apparatus including a sleeve and a substrate having a hole into which the sleeve has been inserted, while a cylindrical mandrel is being rotated out of the sleeve, according to an embodiment of the invention.

FIG. 6 shows a cross section of the apparatus 500 as the cylindrical mandrel 400 is being rotated out of the sleeve 200 inserted into the hole 504 of the substrate 501, according to an embodiment of the invention. The outer surface 202, the bore 204, the inner surface 206, and the lip 502 of the sleeve 200 are depicted in FIG. 6. The ends 402 and 404 and the threads 406 of the cylindrical mandrel 400 are also depicted in FIG. 6.

The cylindrical mandrel 400 is being rotated out of the sleeve 200 in the direction 604 that is opposite to the insertion direction 506 of FIG. 5. That the cylindrical mandrel 400 is rotated as it is being removed from the sleeve 200 is depicted by the arrow 606 in FIG. 6. Where the cylindrical mandrel 400 has already been removed from the sleeve 200 in FIG. 6, threads 602 have been formed by the threaded end 404 of the mandrel 400 within the inner surface 206 defined by the bore 204 of the sleeve 200.

Furthermore, because the cylindrical mandrel 400 is larger in diameter than the bore 204 of the sleeve 200, removing the mandrel 400 from the sleeve 200 causes the sleeve 200 to expand in a direction perpendicular to the bore 204. That is, the sleeve 200 expands radially relative to the bore 204. As such, as is depicted in FIG. 6, the outer surface 202 of the sleeve 200 has engaged the inner surface 508 of the substrate 501 defined by the hole 504 where the cylindrical mandrel 400 has already been removed from the sleeve 200. Because the outer surface 202 is knurled, the outer surface 202 of the sleeve 200 bites into the inner surface 508 of the substrate 501, locking the sleeve 200 in place within the hole 504 of the substrate 501.

Figure 7:
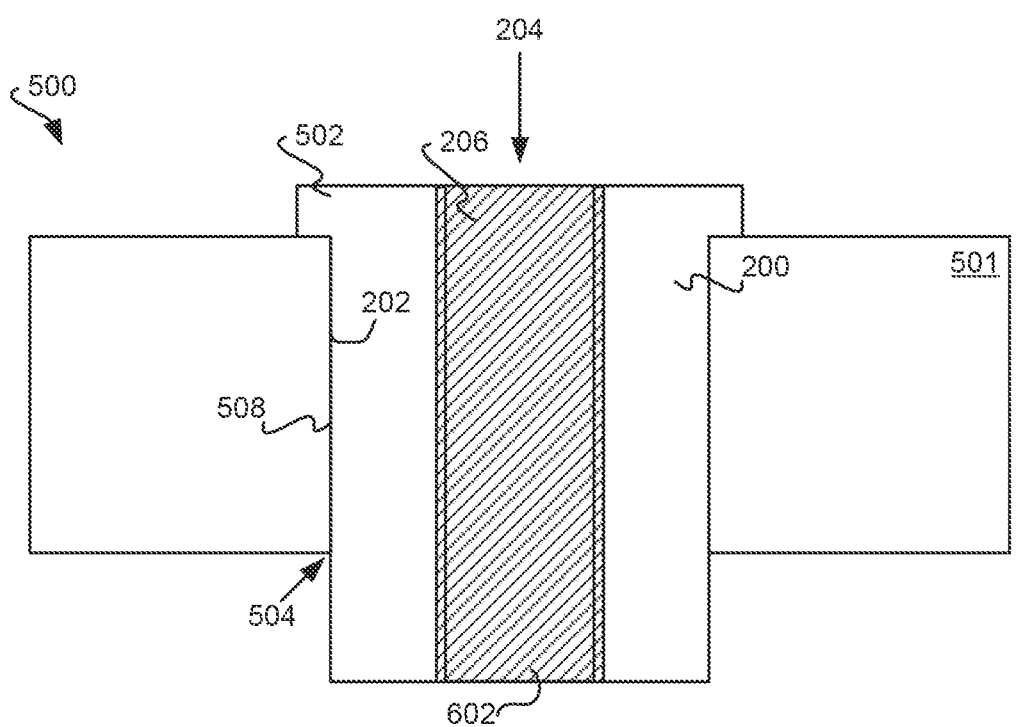
FIG. 7 is a cross-sectional diagram of an apparatus including a sleeve and a substrate having a hole into which the sleeve has been inserted, after a cylindrical mandrel has been rotated out of the sleeve, according to an embodiment of the invention.

FIG. 7 shows a cross section of the apparatus 500 after the cylindrical mandrel 400 has been completely removed from the sleeve 200. The outer surface 202, the bore 204, the inner surface 206, the lip 502, and the threads 602 of the sleeve 200 are depicted in FIG. 7. The hole 504 and the inner surface 508 of the substrate 501 are also depicted in FIG. 7. The cylindrical mandrel 400 is not depicted in FIG. 7, since the mandrel 400 has been completely removed from the sleeve 200.

In FIG. 7, it is apparent that the sleeve 200 has expanded to engage the inner surface 508 of the substrate 501. For instance, the small gap between the inner surface 508 of the substrate 501 and the outer surface 202 of the sleeve 200 present in FIG. 5 is no longer present in FIG. 7. The diameter of the bore 204 has slightly increased in size as well, during the removal of the cylindrical mandrel 400 that formed the threads 602 within the bore 204.

Embodiments of the invention have been described in which a sleeve is placed onto a cylindrical mandrel, after which the sleeve is inserted into a corresponding hole of a substrate, and the cylindrical mandrel is rotated out of the sleeve to form threads within a bore of the sleeve. The cylindrical mandrel in these embodiments includes a threaded end. Rotation of the cylindrical mandrel out of the sleeve specifically results in the threaded end of the mandrel forming the threads within the sleeve's bore.

However, in another embodiment, the cylindrical mandrel is rotated into the sleeve to form threads within the bore of the sleeve, after the sleeve has been inserted into the corresponding hole of the substrate. As such, the sleeve is not placed on the cylindrical mandrel in this embodiment. In this embodiment, the cylindrical mandrel can be rotated into the sleeve in the same direction as the insertion direction in which the sleeve is placed into the hole of the substrate. The cylindrical mandrel may then be removed by, for example, rotating the mandrel out of the sleeve in the opposite direction to which the mandrel was rotated into the sleeve.

Figure 8A:
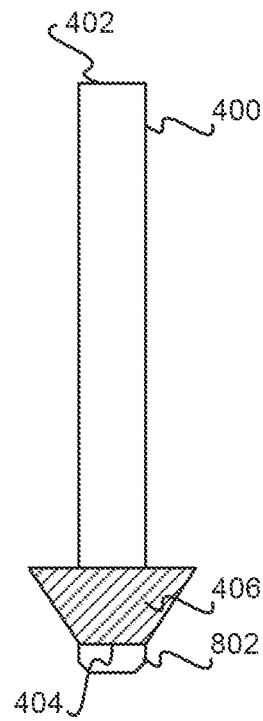
FIGS. 8A and 8B are cross-sectional diagrams of a cylindrical mandrel, according to varying embodiments of the invention.
Figure 8B:
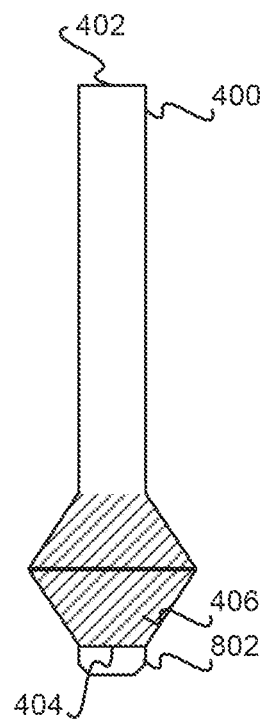

FIGS. 8A and 8B show the cylindrical mandrel 400 as can be used when the mandrel 400 is rotated into the sleeve 200 to form threads within the bore 204 of the sleeve 200 (not shown in FIGS. 8A and 8B), according to varying embodiments of the invention. In both FIGS. 8A and 8B, the cylindrical mandrel 400 has a first end 402 and a second end 404 opposite the first end 402, where the latter end 404 may also be referred to as the threaded end 404 of the mandrel 400. Thus, the cylindrical mandrel 400 has threads 406 at its threaded end 404 in FIGS. 8A and 8B. Past the threaded end 404, the cylindrical mandrel 400 in both FIGS. 8A and 8B includes a tip 802 to assist alignment of the mandrel 400 into the bore 204 of the sleeve 200.

In FIG. 8A, the threaded end 404 increases in diameter along the direction towards the first end 402. As such, the cylindrical mandrel 400 of FIG. 8A forms threads throughout the bore 204 of the sleeve 200 just as the mandrel 400 is being rotated into the sleeve 200. By comparison, in FIG. 8B, the threaded end 404 increases in diameter and then decreases in diameter along the direction towards the first end 402. As such, the cylindrical mandrel 400 of FIG. 8B forms threads throughout the bore 204 of the sleeve 200 both as the mandrel 400 is being rotated into the sleeve 200, and as the mandrel 400 is being rotated out of the sleeve 200.

Although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A system, comprising:
   a sleeve having a bore that is threaded by a threaded end of a mandrel, wherein:
   the mandrel has an increasing diameter at the threaded end;
   the bore has a smaller diameter than the threaded end of the mandrel; and
   a substrate having a hole, wherein:
   the sleeve is disposed within the hole;
   an outer surface of the sleeve is engaged with an inner surface of the hole; and
   the bore is threaded and the outer surface of the sleeve is engaged with the inner surface of the hole by:
   placing the sleeve onto the mandrel such that the sleeve rests on the mandrel towards the threaded end;
   inserting the sleeve and the mandrel into the hole in an insertion direction in which the mandrel enters the hole before the sleeve enters the hole; and
   rotating the mandrel throughout the bore and out of the sleeve in a direction opposite the insertion direction while the sleeve remains disposed within the hole.

2. The system of claim 1, wherein the increasing diameter at the threaded end increases linearly.

3. The system of claim 1, wherein the outer surface of the sleeve is knurled.

4. The system of claim 1, wherein:
   a lip of the sleeve is disposed flat against and not extending into an upper surface of the substrate;
   the upper surface of the substrate being disposed opposite a lower surface of the substrate; and
   the bore extending through the lip of the sleeve.

5. The system of claim 1, wherein the mandrel comprises:
   a rod having a first rod end opposite the threaded end, the threaded end comprising a threaded frustum.

6. The system of claim 5, wherein:
   an outer surface of the rod is unthreaded; and
   the rod has a constant diameter across a length of the rod.

* * * * *